(12) United States Patent
Forthmann et al.

(10) Patent No.: US 8,135,197 B2
(45) Date of Patent: Mar. 13, 2012

(54) AUTOMATIC ADAPTIVE SOFT TISSUE THRESHOLDING FOR TWO-PASS CT CONE-BEAM ARTIFACT REDUCTION

(75) Inventors: Peter Forthmann, Hamburg (DE); Michael Grass, Buchholz in der Nordheide (DE); Roland Proksa, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 944 days.

(21) Appl. No.: 12/090,654

(22) PCT Filed: Oct. 6, 2006

(86) PCT No.: PCT/IB2006/053658
§ 371 (c)(1),
(2), (4) Date: Apr. 18, 2008

(87) PCT Pub. No.: WO2007/046024
PCT Pub. Date: Apr. 26, 2007

(65) Prior Publication Data
US 2008/0292157 A1 Nov. 27, 2008

(30) Foreign Application Priority Data
Oct. 20, 2005 (EP) .................................... 05109786

(51) Int. Cl.
*A61B 6/03* (2006.01)
(52) U.S. Cl. ............. 382/131; 382/128; 378/4; 378/901

(58) Field of Classification Search .......... 382/128–131; 378/4–20
See application file for complete search history.

(56) References Cited

U.S. PATENT DOCUMENTS

| 4,714,997 | A | 12/1987 | Crawford et al. |
| 5,243,664 | A | 9/1993 | Tuy |
| 5,416,815 | A | 5/1995 | Hsieh |
| 5,561,695 | A | 10/1996 | Hu |
| 6,266,388 | B1 * | 7/2001 | Hsieh ............................... 378/8 |
| 6,507,633 | B1 | 1/2003 | Elbakri et al. |
| 2005/0276380 | A1 * | 12/2005 | Varjonen et al. ............. 378/98.9 |

FOREIGN PATENT DOCUMENTS

| EP | 0440797 A1 | 8/1991 |
| EP | 1104917 A2 | 6/2001 |

OTHER PUBLICATIONS

Hsieh, J.; A two-pass algorithm for cone beam reconstruction; 2000; Medical Imaging; Proc. of SPIE; vol. 3979; 533-540.

* cited by examiner

*Primary Examiner* — Edward Glick
*Assistant Examiner* — John Corbett

(57) ABSTRACT

Since the soft tissue levels in an image usually comprise a variety of values between air and bone boundaries, it may not be obvious a priori what threshold value applies. According to an exemplary embodiment of the present invention, an examination apparatus is provided which is adapted for determining the optimal weight for subtraction of a soft tissue correction image without performing a multitude of forward and backward projections. This may be provided determining a roughness function based on a plurality of subtractions of the soft tissue streak image, each subtraction corresponding to a different weighting of the streak image.

20 Claims, 4 Drawing Sheets

AUTOMATIC ADAPTIVE SOFT TISSUE THRESHOLDING FOR TWO-PASS CT CONE-BEAM ARTIFACT REDUCTION

The invention relates to the field of tomographic imaging. In particular, the invention relates to an examination apparatus for examination of an object of interest, to an image processing device, to a method of examination of an object of interest, a computer-readable medium and a program element.

A cone-beam artifact reduction method uses the knowledge that CT cone-beam artifacts stem from strong gradients in a body under examination, caused by extreme-density variations of the interfaces between air, bone and soft tissue. Such a method is described in J. Hsieh, A two-pass algorithm for cone beam reconstruction, Proceedings of SPIE, 3979 (2000), which is hereby incorporated by reference.

The method works by segmenting these regions out of the reconstructed image, in order to let the resulting image undergo a second pass, entailing a simulated forward projection and a subsequent reconstruction. The aim of this procedure is to reproduce, as well as possible, the disturbing artifacts. These artifacts may now appear in front of a known background, defined by the previous segmentation model. Subtracting this background may yield to an isolation of the artifacts (into so-called streak images). Afterwards, the artifacts may be removed from the original image by subtraction.

There are a number of conceivable methods of thresholding the first-pass image, which has considerable impact on the efficiency of the method. One important point in segmenting is the inclusion of soft tissue. Proper segmentation of air and bone may be performed relatively easily by setting fixed thresholds. However, since the soft tissue levels in an image usually comprise a whole variety of values between the air and bone boundaries, it may not be obvious a priori what threshold value applies here.

It may be desirable to have an improved soft tissue artifact correction.

According to an exemplary embodiment of the present invention, an examination apparatus for examination of an object of interest may be provided, the examination apparatus comprising a calculation unit adapted for performing an adaptive artifact reduction on the basis of a roughness function, resulting in a final image of the object of interest, wherein the roughness function is based on a plurality of weighting values applied to a first streak-only image, and wherein the final image corresponds to a minimum of the roughness function.

Therefore, a roughness function may be calculated from the initial reconstructed image and from a streak-only image which has been weighted with different weighting values. Therefore, a parameter of the roughness function may be the weighting value of the first streak image, which is varied within a certain range. The minimum of the roughness function may then be identified and from that minimum the final (artifact reduced) image may be determined.

Therefore, instead of experimentally varying the soft tissue level in the segmentation and forward-/back-projecting each time in order to assess the resulting images, the above described automatic procedure may be performed.

According to another exemplary embodiment of the present invention, the calculation unit is adapted for performing a first segmentation of a first region from a reconstructed image of the object of interest, resulting in a first segmented image, setting all voxels of the first segmented image to a constant value, resulting in a second segmented image, performing a forward-backprojection on the second segmented image, resulting in a first streak image, and performing a first subtraction of the second segmented image from the first streak image, resulting in the first streak-only image.

According to another exemplary embodiment of the present invention, the calculation unit is adapted for performing a second subtraction of the first streak-only image, weighted with a first weighting value, from the reconstructed image, resulting in first image data, performing a third subtraction of the first streak-only image, weighted with a second weighting value, from the reconstructed image, resulting in second image data, determining the roughness function on the basis of the first and second image data, and determining a third weighting value which corresponds to a minimum of the roughness function, and performing a fourth subtraction of the first streak-only image, weighted with the third weighting value, from the reconstructed image, resulting in the final image.

According to another exemplary embodiment of the present invention, the calculation unit is adapted for performing a second segmentation of a second region from the reconstructed image, resulting in a third segmented image, performing a forward-backprojection on the third segmented image, resulting in a second streak image, performing a fifth subtraction of the third segmented image from the second streak image, resulting in a second streak-only image, and performing a sixth subtraction of the second streak-only image from the reconstructed image, resulting in a corrected reconstructed image from which the second, third and fourth subtractions are then performed.

According to another exemplary embodiment of the present invention, the calculation unit is further adapted for performing a second segmentation of a second region from the reconstructed image, resulting in a fifth streak image, and performing a third subtraction of the fifth streak image from the reconstructed image, resulting in a corrected reconstructed image from which the first and second subtractions are then performed.

In other words, two segmentations are performed from the original reconstructed image, one segmentation corresponding to a first region (of a first material) and the second segmentation corresponding to a second region (of a second material). Then, one of the segmented images is subtracted from the original reconstructed image. Then, the weighted subtractions of the other segmented image are performed, resulting in a variety of reduced images. This variety of reduced images is then further analized.

According to another exemplary embodiment of the present invention, the first region corresponds to a soft tissue region. Furthermore, the second region may correspond to a bone region.

Therefore, a method of automatic adaptive soft tissue thresholding may be provided.

According to another exemplary embodiment of the present invention, the segmentation of the first region comprises a definition of a soft tissue regime by selecting voxels having a value within a pre-set interval.

According to another exemplary embodiment of the present invention, this pre-set interval may range from −350 Hounsfield Units (HU) to +350 Hounsfield Units. it should be noted, however, that the pre-set range may as well vary between −500 HU to +500 HU or between −200 HU to +200 HU.

This interval may be pre-set by a user or automatically, according to the specific circumstances of the measurement.

According to another exemplary embodiment of the present invention, the examination apparatus may further comprise a radiation source adapted for emitting electromagnetic radiation to the object of interest, and a detector unit adapted for detecting electromagnetic radiation from the object of interest, wherein the calculation unit is adapted for reconstructing an image of the object of interest on the basis of the detected radiation.

The roughness function may be the sum of the absolute values of the sums of second derivatives in x, y, and z at each of the selected voxels.

According to another exemplary embodiment of the present invention, the radiation source and the detector unit may be adapted to rotate according to a helical trajectory with respect of the object of interest.

Furthermore, according to another exemplary embodiment of the present invention, the radiation source is adapted as a polychromatic x-ray source.

According to another exemplary embodiment of the present invention, the examination apparatus may be applied as a baggage inspection apparatus, a medical application apparatus, a material testing apparatus or a material science analysis apparatus. A field of application of the invention may be material science analysis, since the defined functionality of the invention may allow for a secure, reliable and highly accurate analysis of a material.

According to another exemplary embodiment of the present invention, the examination apparatus may further comprise a collimator arranged between the electromagnetic radiation source and the detector unit, wherein the collimator is adapted for collimating an electromagnetic radiation beam emitted by the electromagnetic radiation source to form a cone-beam or a fan-beam.

Furthermore, according to another exemplary embodiment of the present invention, the examination apparatus may be configured as one of the group consisting of a computer tomography apparatus, a coherent scatter computed tomography apparatus, a single photon emission computed tomography apparatus, and a positron emission computed tomography apparatus.

According to another exemplary embodiment of the present invention, an image processing device for examination of an object of interest may be provided, the image processing device comprising a memory for storing data of the object of interest. Furthermore, the image processing device may comprise a calculation unit adapted for performing an adaptive artifact reduction on the basis of a roughness function, resulting in a final image of the object of interest, wherein the roughness function is based on a plurality of weighting values applied to a first streak-only image, and wherein the final image corresponds to a minimum of the roughness function.

Therefore, an image processing device may be provided which is adapted for performing an improved soft tissue artifact correction in, for example, a cone-beam computer tomography apparatus.

According to another exemplary embodiment of the present invention, a method of examination of an object of interest may be provided, the method comprising the step of performing an adaptive artifact reduction on the basis of a roughness function, resulting in a final image of the object of interest, wherein the roughness function is based on a plurality of weighting values applied to a first streak-only image, and wherein the final image corresponds to a minimum of the roughness function.

According to another exemplary embodiment of the present invention, the step of performing an adaptive artifact reduction comprises performing a first segmentation of a first region from a reconstructed image of the object of interest, resulting in a first segmented image, setting all voxels of the first segmented image to a constant value, resulting in a second segmented image, performing a forward-backprojection on the second segmented image, resulting in a first streak image, and performing a first subtraction of the second segmented image from the first streak image, resulting in the first streak-only image.

According to another exemplary embodiment of the present invention the step of performing an adaptive artifact reduction comprises performing a second subtraction of the first streak-only image, weighted with a first weighting value, from the reconstructed image, resulting in first image data, performing a third subtraction of the first streak-only image, weighted with a second weighting value, from the reconstructed image, resulting in second image data, determining the roughness function on the basis of the first and second image data, and determining a third weighting value which corresponds to a minimum of the roughness function, and performing a fourth subtraction of the first streak-only image, weighted with the third weighting value, from the reconstructed image, resulting in the final image.

Aspects of the above described examination apparatus may also be applied to the method according to an exemplary embodiment of the present invention, or to the computer-readable medium, the image processing device or the program element.

According to another exemplary embodiment of the present invention, a computer-readable medium may be provided, in which a computer program of examination of an object of interest is stored which, when being executed by a processor, is adapted to carry out the above-mentioned method steps.

Furthermore, the present invention relates to a program element of examination of an object of interest, which may be stored on the computer-readable medium. The program element may be adapted to carry out the steps of performing an adaptive artifact reduction on the basis of a roughness function, resulting in a final image of the object of interest, wherein the roughness function is based on a plurality of weighting values applied to a first streak-only image, wherein the final image corresponds to a minimum of the roughness function.

The program element may preferably be loaded into working memories of a data processor. The data processor may thus be equipped to carry out exemplary embodiments of the methods of the present invention. The computer program may be written in any suitable programming language, such as, for example, C++ and may be stored on a computer-readable medium, such as a CD-ROM. Also, the computer program may be available from a network, such as the WorldWideWeb, from which it may be downloaded into image processing units or processors, or any suitable computers.

It may be seen as the gist of an exemplary embodiment of the present invention that a scheme for finding an optimal, object-dependent weight for subtraction of a soft-tissue correction image may be provided, which may lead to a considerable streak reduction in the final images. According to an aspect of the present invention, an automatic adaptive soft tissue thresholding for two-pass CT cone-beam artifact reduction may be performed on the basis of a roughness function, wherein the roughness function is based on a plurality of subtractions of the soft-tissue streak image, wherein each subtraction corresponds to an individual weighting of the soft tissue streak image. The minimum of the roughness function is then used for determining the optimal weighting value of the streak image.

These and other aspects of the present invention will become apparent from and elucidated with reference to the embodiments described hereinafter.

Exemplary embodiments of the present invention will be described in the following, with reference to the following drawings.

The illustration in the drawings is schematically. In different drawings, similar or identical elements are provided with the same reference numerals.

Figure 1:
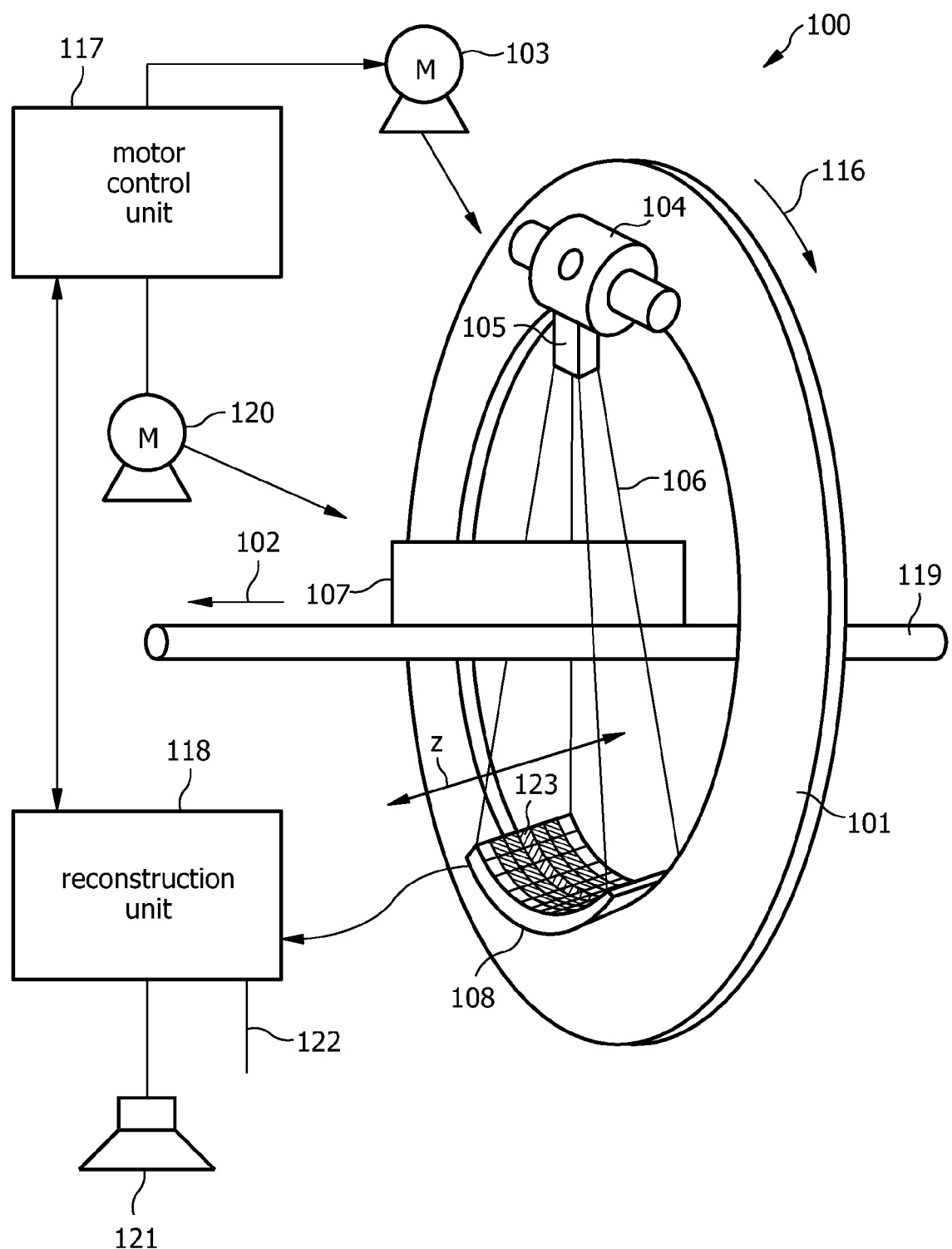
FIG. 1 shows a simplified schematic representation of an examination apparatus according to an exemplary embodiment of the present invention.

FIG. 1 shows an examination apparatus according to an exemplary embodiment of the present invention which is adapted as a computer tomography apparatus. With reference to this exemplary embodiment, the present invention will be described for the application in the field of baggage inspection. However, it should be noted that the present invention is not limited to this application, but may also be applied in the field of medical imaging, or other industrial applications, such as material testing.

The computer tomography apparatus 100 depicted in FIG. 1 is a cone-beam CT scanner. The CT scanner depicted in FIG. 1 comprises a gantry 101, which is rotatable around a rotational axis 102. The gantry 101 is driven by means of a motor 103. Reference numeral 104 designates a source of radiation such as an X-ray source, which, according to an aspect of the present invention, emits a polychromatic radiation.

Reference numeral 105 designates an aperture system which forms the radiation beam emitted from the radiation source to a cone-shaped radiation beam 106. The cone-beam 106 is directed such that it penetrates an object of interest 107 arranged in the centre of the gantry 101, i.e. in an examination region of the CT scanner, and impinges onto the detector 108. As may be taken from FIG. 1, the detector 108 is arranged on the gantry 101 opposite to the source of radiation 104, such that the surface of the detector 108 is covered by the cone-beam 106. The detector 108, which is depicted in FIG. 1, comprises a plurality of detector elements 123 each capable of detecting, in an energy-resolving manner, X-rays or individual photons which have penetrated the object of interest 107.

During a scan of the object of interest 107, the source of radiation 104, the aperture system 105 and the detector 108 are rotated along the gantry 101 in the direction indicated by arrow 116. For rotation of the gantry 101 with the source of radiation 104, the aperture system 105 and the detector 108, the motor 103 is connected to a motor control unit 117, which is connected to a calculation or correction unit 118.

In FIG. 1, the object of interest 107 may be a patient or an item of baggage which is disposed on a conveyor belt 119. During the scan of the object of interest 107, while the gantry 101 rotates around the item of baggage 107, the conveyor belt 119 displaces the object of interest 107 along a direction parallel to the rotational axis 102 of the gantry 101. By this, the object of interest 107 is scanned along a helical scan path. The conveyor belt 119 may also be stopped during the scans to thereby measure single slices. Instead of providing a conveyor belt 119, for example, in medical applications where the object of interest 107 is a patient, a movable table may be used. However, it should be noted that in all of the described cases it may also be possible to perform other scan paths such as the saddle trajectory by moving the table periodically back and forth at twice the frequency of the source-detector arrangement.

The detector 108 may be connected to the calculation or correction unit 118. The correction unit 118 may receive the detection result, i.e. the read-outs from the detector elements 123 of the detector 108 and may determine a scanning result on the basis of the read-outs. Furthermore, the correction unit 118 communicates with the motor control unit 117 in order to coordinate the movement of the gantry 101 with motors 103 and 120 with the conveyor belt 119.

The correction unit (118) may be adapted for performing an adaptive artifact reduction on the basis of a roughness function, resulting in a final image of the object of interest (107), according to an exemplary embodiment of the present invention. A reconstructed image generated by the correction unit 118 may be output to a display (not shown in FIG. 1) via an interface 122.

The correction unit 118 may be realized by a data processor to process read-outs from the detector elements 123 of the detector 108.

Furthermore, as may be taken from FIG. 1, the correction unit 118 may be connected to a loudspeaker 121, for example, to automatically output an alarm in case of the detection of suspicious material in the item of baggage 107.

The computer tomography apparatus 100 for examination of the object of interest 107 includes the detector 108 having the plurality of detecting elements 123 arranged in a matrix-like manner, each being adapted to detect X-rays. Furthermore, the computer tomography apparatus 100 comprises the determination unit or reconstruction unit 118 adapted for reconstructing an image of the object of interest 107.

The computer tomography apparatus 100 comprises the X-ray source 104 adapted to emit X-rays to the object of interest 107. The collimator 105 provided between the electromagnetic radiation source 104 and the detecting elements 123 is adapted to collimate an electromagnetic radiation beam emitted from the electromagnetic radiation source 104 to form a cone-beam. The detecting elements 123 form a multi-slice detector array 108. The computer tomography apparatus 100 may be configured as a medical imaging apparatus or baggage inspection apparatus.

Figure 2:
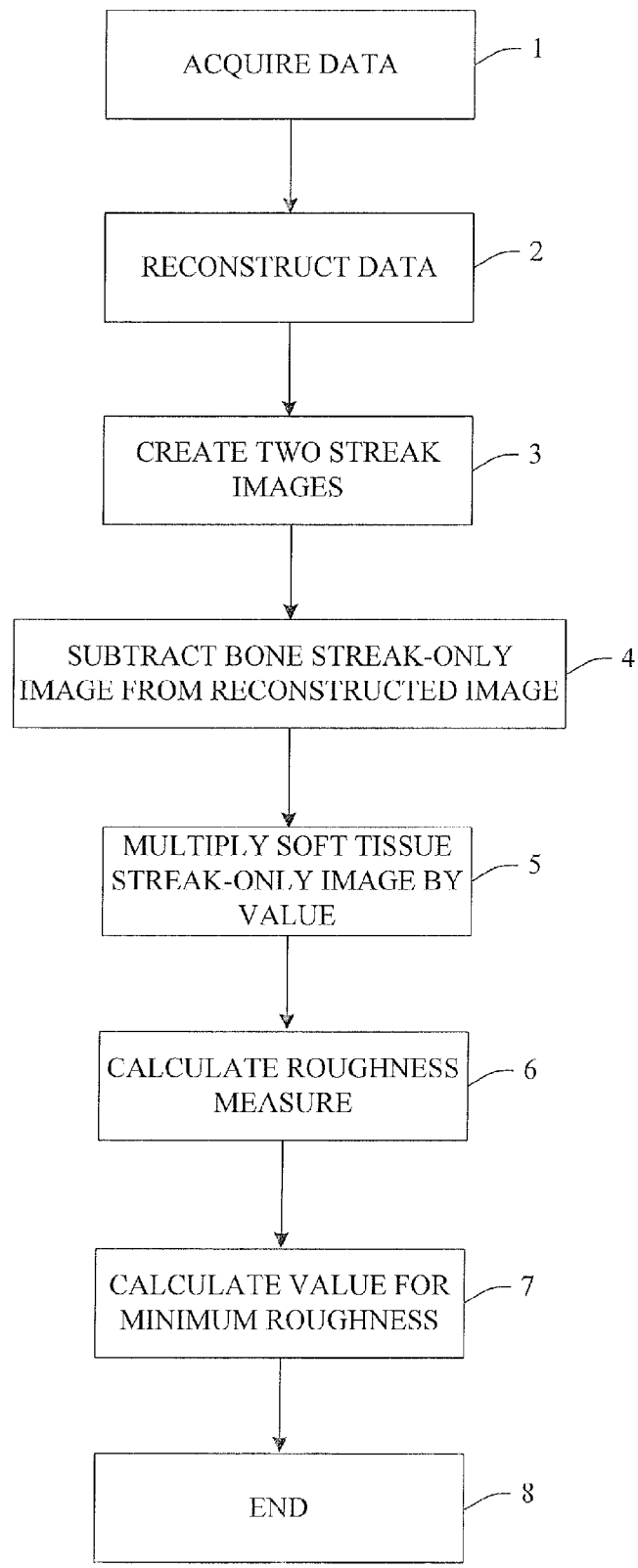
FIG. 2 shows a flow-chart of an exemplary method according to the present invention.

FIG. 2 shows a flow-chart of an exemplary method according to the present invention. In step 1, a data acquisition is performed, for example by emitting an electromagnetic radiation beam from the radiation source to the object of interest and by detecting the transmitted radiation from the object of interest.

Then, in step 2, a reconstruction of the detection data is performed, resulting in an original reconstructed image.

Then, in step 3, two streak images are created, one from a subtraction of a forward-backprojected bone segmentation and the bone segmentation and one from a subtraction of a forward-backprojected soft-tissue segmentation and the soft tissue segmentation, resulting in a bone streak-only image and in a soft tissue streak-only image.

The soft tissue segmentation is performed by defining a soft tissue regime, for example between −350 to 350 Hounsfield Units in the original reconstructed image. All voxels in the original reconstructed image that fall in this range will be set to a value of 0 Hounsfield Units in the segmented soft tissue image.

Then, in step 4, the bone streak-only image is subtracted from the original reconstructed image. From the resulting image, in step 5, the soft tissue streak-only image multiplied by a factor $\alpha$ for a range of $\alpha$ values is subtracted. This subtraction results in a multitude of images, each corresponding to a respective weighting factor $\alpha$. For example, the weighting factor $\alpha$ is varied between 0 and 1.

Then, in step 6, a roughness measure $r(\alpha)$ is calculated for the multitude of images. The roughness measure is the sum of the absolute values of the sums of the second derivatives in x, y, and z at each voxel:

$$g'(x, y, z, \alpha) = \text{original}(x, y, z) - \text{streaks}_{bone}(x, y, z) - \alpha \text{streaks}_{soft}(x, y, z)$$

$$r(\alpha) = \sum_{voxels} |\Delta g'(x, y, z, \alpha)|$$

$$= 6g'(x, y, z, \alpha) - g'(x-1, y, z, \alpha) \ldots - g'(x, y, z+1, \alpha)$$

Then, in step 7, the $\alpha$ value is determined, for which the roughness function enters its minimum. This $\alpha$ value is then used as a weighting value for the soft tissue streak image being subtracted from the original reconstructed image (from which the bone streak image has already been subtracted).

The method then continues with step 8, where it ends.

Therefore, instead of experimentally varying the soft tissue level in the segmentation and forward-/back-projecting each time, in order to assess the resulting image, the above described automatic method may be performed.

Figure 3:
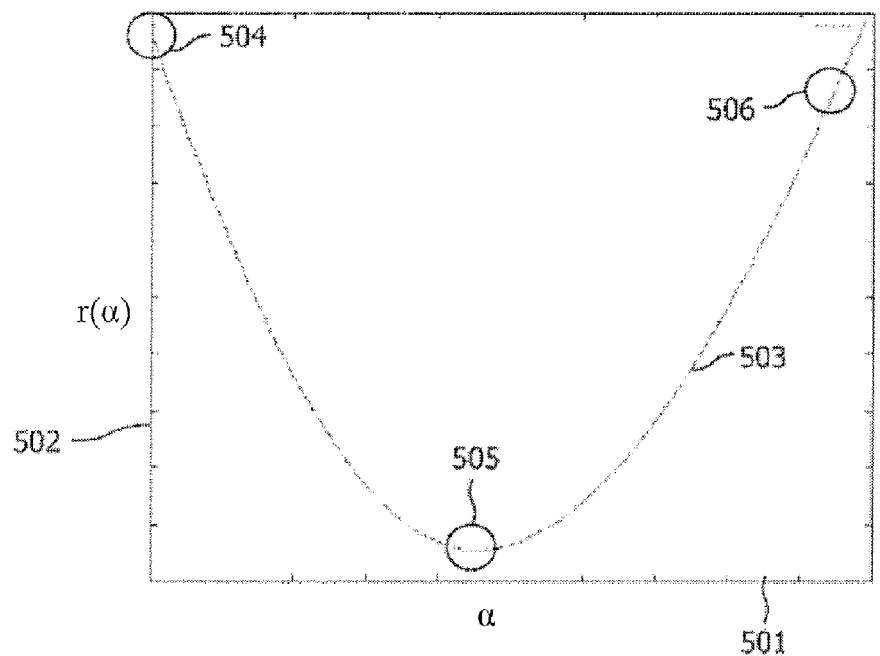
FIG. 3 shows an exemplary schematic roughness function.

FIG. 3 shows an exemplary roughness function according to the above described calculation scheme. The horizontal axis 501 corresponds to the weighting or multiplication factor $\alpha$ and ranges from 0 to 1. The vertical axis 502 corresponds to the roughness and varies between 23.5 to 28.5. As may be seen from the curve 503 in FIG. 4, the roughness function comprises a minimum 505, which corresponds to an $\alpha$ value of approximately 0.47. Using this $\alpha$ value as a weighting value for the soft tissue streak image may result in the corrected image depicted in FIG. 6.

Figure 4:
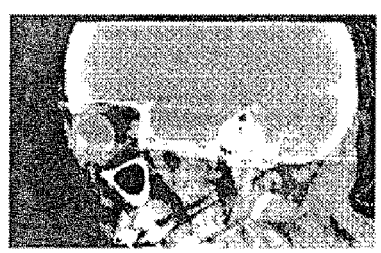
FIG. 4 shows a reconstructed image with no soft-tissue streak correction.

Furthermore, the roughness function 503 comprises a value 504 at an $\alpha$ value of 0, which corresponds to the original reconstructed image depicted in FIG. 4. Furthermore, the roughness function comprises a value 506, resulting from an $\alpha$ value of approximately 0.9 and corresponding to the over-corrected image depicted in FIG. 5.

Figure 5:
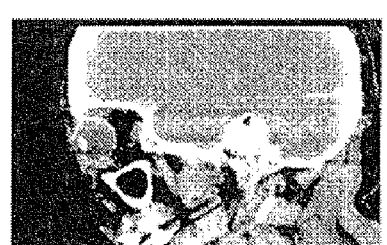
FIG. 5 shows the reconstructed image of FIG. 4 being overcorrected.
Figure 6:
FIG. 6 shows the reconstructed image of FIG. 4 being properly corrected.

FIG. 4 shows the original reconstructed image without a soft tissue streak correction ($\alpha=0$), after a bone-streak correction as described in step 4 of FIG. 2. FIGS. 4 to 6 show different corrected (stereo tube) images corresponding to specific alphas. As may be seen from FIG. 4, significant soft tissue streaks are present.

FIG. 5 shows an overcorrected image with an $\alpha$ value 506 above the optimum value 505. As may be seen from FIG. 5, there are significant streaks present.

FIG. 6 shows a properly corrected image, corresponding to the $\alpha$ value 505 which corresponds to the minimum of the roughness function. Therefore, the $\alpha$ value used for the correction of the image depicted in FIG. 6 is the value for which the curve of FIG. 3 shows minimal roughness, resulting in an optimal streak reduction.

It should be noted that the method described by Hsieh excels for the stereo tube. For standard circular, the reconstructable region from the second pass may shrink considerably, and so may the image region eligible for correction. This may not be the case for stereo.

Figure 7:
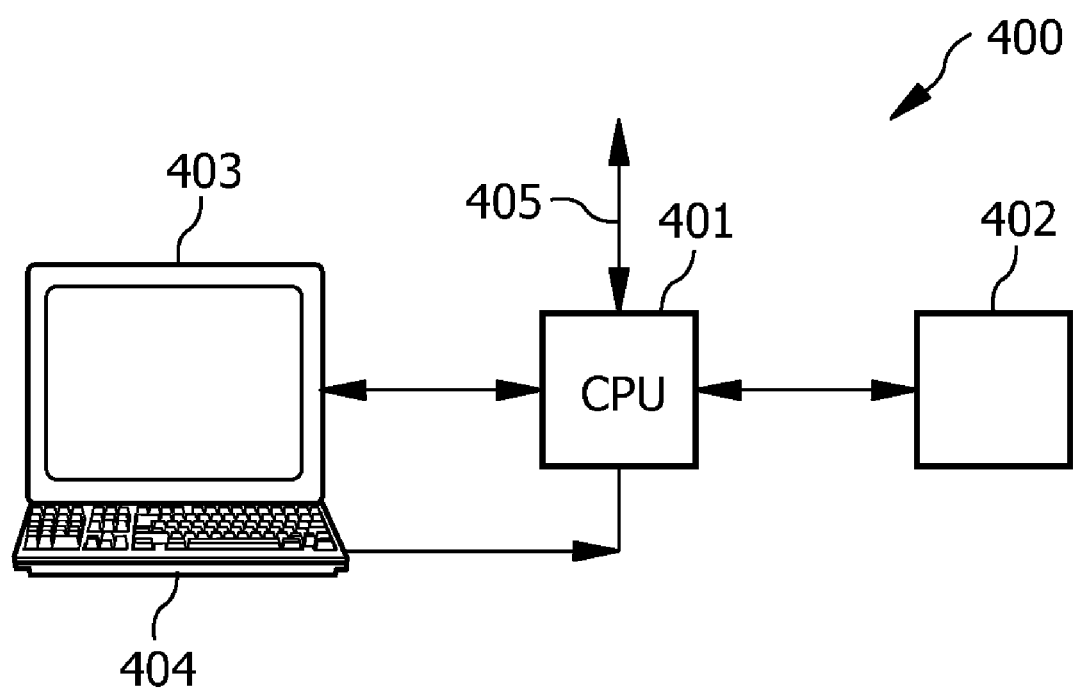
FIG. 7 shows an exemplary embodiment of an image processing device according to the present invention, for executing an exemplary embodiment of a method in accordance with the present invention.

FIG. 7 depicts an exemplary embodiment of a data processing device 400 according to the present invention for executing an exemplary embodiment of a method in accordance with the present invention. The data processing device 400 depicted in FIG. 7 comprises a central processing unit (CPU) or image processor 401 connected to a memory 402 for storing an image depicting an object of interest, such as a patient or an item of baggage. The data processor 401 may be connected to a plurality of input/output network or diagnosis devices, such as a CT device. The data processor 401 may furthermore be connected to a display device 403, for example, a computer monitor, for displaying information or an image computed or adapted in the data processor 401. An operator or user may interact with the data processor 401 via a keyboard 404 and/or other output devices, which are not depicted in FIG. 7.

Furthermore, via the bus system 405, it may also be possible to connect the image processing and control processor 401 to, for example, a motion monitor, which monitors a motion of the object of interest. In case, for example, a lung of a patient is imaged, the motion sensor may be an exhalation sensor. In case the heart is imaged, the motion sensor may be an electrocardiogram.

Exemplary embodiments of the invention may be sold as a software option to CT scanner console, imaging workstations or PACS workstations.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An examination apparatus for examination of an object of interest, the examination apparatus comprising:
    a calculation unit that creates a first streak-only image on a basis of a first segmentation of a first region from a reconstructed image of the object of interest; creates a second streak-only image on a basis of a second segmentation of a second region from the reconstructed image; subtracts the second streak-only image from the reconstructed image, resulting in a corrected reconstructed image; and subtracts the first streak-only image, weighted by a first weighting value, from the corrected reconstructed image, thereby performing an adaptive artifact reduction on the basis of a roughness function, resulting in a final image of the object of interest; wherein the roughness function is based on the first weighting value applied to the first streak-only image; and wherein the final image corresponds to a minimum of the roughness function.

2. The examination apparatus of claim 1, wherein the calculation unit:
    performs a first segmentation of the first region from the reconstructed image of the object of interest, resulting in a first segmented image; sets all voxels of the first segmented image to a constant value, resulting in a second segmented image; performs a forward-backprojection on the second segmented image, resulting in a first streak image;
    performs a first subtraction of the second segmented image from the first streak image, resulting in the first streak-only image.

3. The examination apparatus of claim 2, wherein the calculation unit further:
  performs a second subtraction of the first streak-only image, weighted with the first weighting value, from the reconstructed image, resulting in first image data;
  performs a third subtraction of the first streak-only image, weighted with a second weighting value, from the reconstructed image, resulting in second image data;
  determines the roughness function on the basis of the first and second image data, and
  determines a third weighting value which corresponds to a minimum of the roughness function;
  performs a fourth subtraction of the first streak-only image, weighted with the third weighting value, from the reconstructed image, resulting in the final image.

4. The examination apparatus of claim 2, wherein the first region corresponds to a soft tissue region.

5. The examination apparatus of claim 2, wherein the segmentation of the first region comprises a definition of a soft tissue regime by selecting voxels having a value within a pre-set interval.

6. The examination apparatus of claim 2, wherein the pre-set interval ranges from −350 Hounsfield Units to 350 Hounsfield Units.

7. The examination apparatus of claim 2, wherein the roughness function is the sum of the absolute values of the sums of second derivatives in x, y, and z at each of the selected voxels.

8. The examination apparatus of claim 1, wherein the calculation unit further:
  performs the second segmentation of the second region from the reconstructed image, resulting in a third segmented image; and performing a forward-backprojection on the third segmented image, resulting in the second streak image;
  performs a fifth subtraction of the third segmented image from the second streak image, resulting in a second streak-only image;
  performs a sixth subtraction of the second streak-only image from the reconstructed image, resulting in the corrected reconstructed image from which the second, third and fourth subtractions are then performed.

9. The examination apparatus of claim 8, wherein the second region corresponds to a bone region.

10. The examination apparatus of claim 1, further comprising:
  a radiation source adapted for emitting electromagnetic radiation to the object of interest; and
  a detector unit adapted for detecting electromagnetic radiation from the object of interest; wherein the calculation unit is adapted for reconstructing the image of the object of interest on the basis of the detected radiation.

11. The examination apparatus of claim 10, wherein the radiation source and the detector unit rotate according to a helical trajectory with respect to the object of interest.

12. The examination apparatus of claim 10, wherein the radiation source is adapted as a polychromatic x-ray source.

13. The examination apparatus of claim 1, wherein the examination apparatus is a baggage inspection apparatus, a medical application apparatus, a material testing apparatus or a material science analysis apparatus.

14. The examination apparatus of claim 1, wherein the examination apparatus is a computer tomography apparatus, a coherent scatter computed tomography apparatus, a single photon emission computed tomography apparatus, or positron emission computed tomography apparatus.

15. The examination apparatus of claim 1, further comprising a collimator arranged between an electromagnetic radiation source and a detector unit; wherein the collimator is adapted for collimating an electromagnetic radiation beam emitted by the electromagnetic radiation source to form a fan-beam or a cone-beam.

16. An image processing device for examination of an object of interest, the image processing device comprising:
  a memory for storing data of the object of interest;
  a calculation unit that performs an adaptive artifact reduction on the basis of a roughness function, resulting in a final image of the object of interest;
  wherein the roughness function is based on at least one weighting value applied to a first streak-only image;
  and wherein the final image corresponds to a minimum of the roughness function;
  wherein the calculation unit:
  creates the first streak-only image on the basis of a first segmentation of a first region from a reconstructed image of the object of interest;
  creates a second streak-only image on the basis of a second segmentation of a second region from the reconstructed image;
  subtracts the second streak-only image from the reconstructed image, resulting in a corrected reconstructed image;
  subtracts the first streak-only image, weighted by a first weighting value, from the corrected reconstructed image.

17. A method of examination of an object of interest, the method comprising the step of:
  performing an adaptive artifact reduction on the basis of a roughness function, resulting in a final image of the object of interest; wherein the roughness function is based on at least one weighting value applied to a first streak-only image; and wherein the final image corresponds to a minimum of the roughness function; wherein the adaptive artefact reduction comprises the steps of:
  creating the first streak-only image on the basis of a first segmentation of a first region from a reconstructed image of the object of interest;
  creating a second streak-only image on the basis of a second segmentation of a second region from the reconstructed image;
  subtracting of the second streak-only image from the reconstructed image, resulting in a corrected reconstructed image;
  subtracting the first streak-only image, weighted by a first weighting value, from the corrected reconstructed image.

18. The method of claim 17, wherein the step of performing an adaptive artifact reduction comprises:
  performing the first segmentation of the first region from the reconstructed image of the object of interest, resulting in a first segmented image;
  setting all voxels of the first segmented image to a constant value, resulting in a second segmented image;
  performing a forward-backprojection on the second segmented image, resulting in a first streak image; and
  performing a first subtraction of the second segmented image from the first streak image, resulting in the first streak-only image.

19. The method of claim 18, wherein the step of performing an adaptive artifact reduction comprises:
  performing a second subtraction of the first streak-only image, weighted with the first weighting value, from the reconstructed image, resulting in first image data; performing a third subtraction of the first streak-only image, weighted with the second weighting value, from the reconstructed image, resulting in second image data;

determining the roughness function on the basis of the first and second image data, and determining a third weighting value which corresponds to a minimum of the roughness function; and performing a fourth subtraction of the first streak-only image, weighted with the third weighting value, from the reconstructed image, resulting in the final image.

20. A non-transitory computer-readable medium encoded with computer readable instructions which, when executed by a processor, causes the processor to:

perform an adaptive artifact reduction on a basis of a roughness function, resulting in a final image of an object of interest; wherein a roughness function is based on at least one weighting value applied to a first streak-only image; and wherein the final image corresponds to a minimum of the roughness function; in which the processor creates the first streak-only image on the basis of a first segmentation of a first region from a reconstructed image of the object of interest;

creates a second streak-only image on the basis of a second segmentation of a second region from the reconstructed image;

subtracts of the second streak-only image from the reconstructed image, resulting in a corrected reconstructed image;

subtracts the first streak-only image, weighted by a first weighting value, from the corrected reconstructed image.

* * * * *